July 23, 1968 G. DURSTEWITZ 3,393,745
WATER-POWERED FIRE-FIGHTING FOAM GENERATOR
Filed Nov. 21, 1966 2 Sheets-Sheet 1
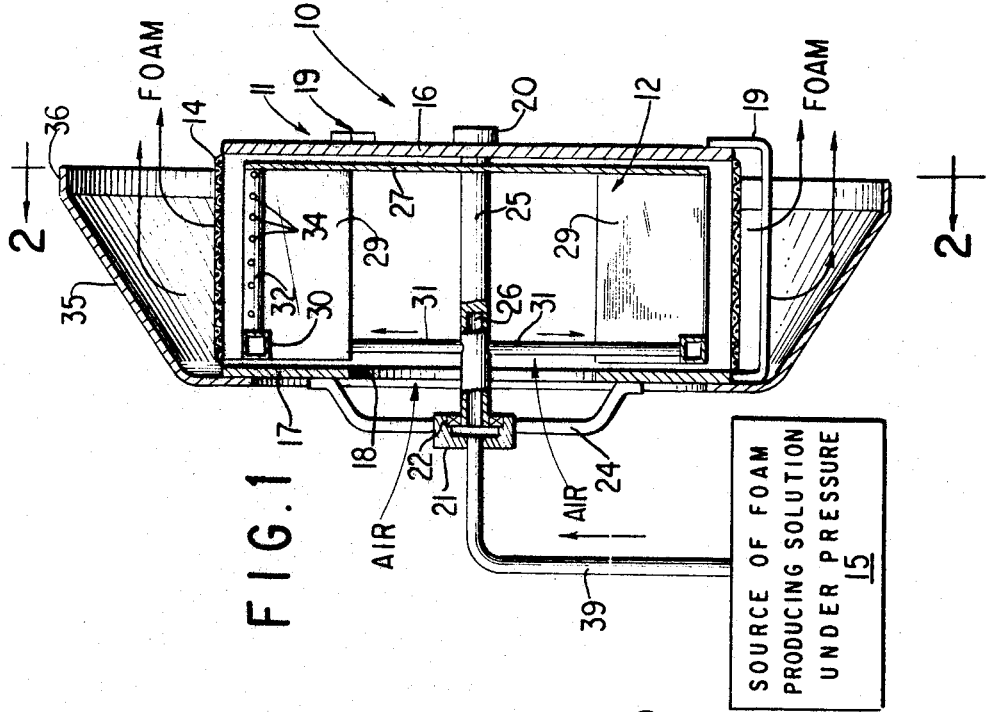
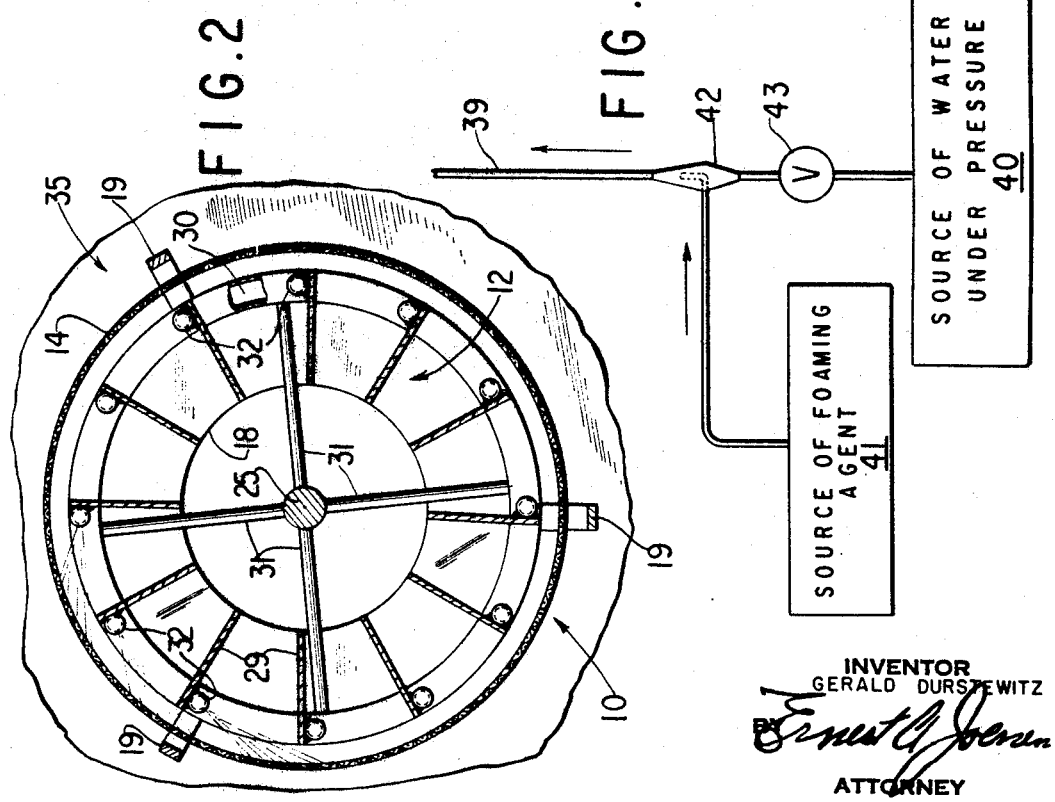
INVENTOR
GERALD DURSTEWITZ
ATTORNEY July 23, 1968 G. DURSTEWITZ 3,393,745
WATER-POWERED FIRE-FIGHTING FOAM GENERATOR
Filed Nov. 21, 1966 2 Sheets-Sheet 2

INVENTOR
GERALD DURSTEWITZ
ATTORNEY

United States Patent Office 3,393,745
Patented July 23, 1968

3,393,745
WATER-POWERED FIRE-FIGHTING
FOAM GENERATOR
Gerald Durstewitz, Pompton Lakes, N.J., assignor, by
mesne assignments, to Walter Kidde & Company, Incorporated, Belleville, N.J., a corporation of New York
Filed Nov. 21, 1966, Ser. No. 595,983
17 Claims. (Cl. 169—15)

ABSTRACT OF THE DISCLOSURE

This invention relates to fire-fighting foam generating apparatus, and, more particularly to such apparatus which includes a centrifugal fan, a cylindrical foam forming net surrounding the fan, a source of foam producing solution under pressure, and a plurality of reaction nozzles mounted on the fan rotor for spraying the solution onto the net and for driving the fan rotor by the reaction forces thus produced to pump air outwardly through the net to generate high expansion foam.

Previously, apparatus for producing high expansion foam included a generally tubular body forming a wind tunnel, a fabric net stretched across the outlet end of the wind tunnel, a fan mounted at the inlet end of the wind tunnel for producing the air flow through the tunnel, and nozzles between the fan and the net for spraying a solution of water and a foaming agent onto the net. The solution sprayed onto the net flows over the net and a thin film of this solution bridges each hole of the net fabric. The air propelled by this fan flows through the holes and pushes the film in front of it to form a bubble at each hole. These bubbles are pushed away from the net by the next set of bubbles formed so that a plug of foam is generated at the down-wind side of the net. A foam generator of this type is shown and described in detail in United States Patent No. 3,241,617.

In the past, foam has been efficiently produced by such devices in which a gasoline or electric motor is employed to operate the fan.

In most instances these devices are used or installed in locations where the water for the unit is taken from a municipal water supply, or the like, and therefore is delivered to the unit under pressure.

Frequently, it would be advantageous if the energy of the water supply pressure could be utilized to provide the power required to drive the fan. This would tend to reduce the cost of the unit, and would also make the unit more reliable since it would not be dependent upon a local electrical power supply or the operation of a gasoline engine.

The reliability of a water powered unit is of particular importance in the case of permanently installed units which are under the control of fire detecting systems so as to be automatically started when a fire occurs. In such installations, a gasoline motor is not acceptable because of the difficulty of automatically starting such engines. Electric motors are less objectionable, however, there is a distinct possibility that the electrical supply could be interrupted during a fire, particularly if the fire resulted from a malfunction in the electrical systems.

The prior art

The attempts made in the past to produce an efficient water powered foam generator have not been successful.

The water powered units previously marketed have used the same axial flow arrangement described above, that is, a net provided at one end of a tubular wind tunnel and a fan is provided at the other end to propel air axially through the tunnel toward the net. The power for driving the fan is provided by a set of reaction water nozzles which are mounted between the fan and the net on a shaft common to the fan. The nozzles are positioned at an angle with respect to a plane perpendicular to the shaft so that they point in the general direction of the net. A solution of water and foaming agent under pressure is delivered to the nozzles and flows out of the nozzles to produce a reaction force upon the shaft for driving the fan. The angular placement of the nozzles causes the solution issuing from the nozzles to be directed toward the outlet end of the wind tunnel for the purpose of wetting the net with the solution. An additional nozzle is mounted at the axis of the shaft and directs a spray of solution parallel to the shaft to wet the center of the net.

The shortcomings of the prior art arrangement

The efficiency of a water powered unit depends upon the percentage of the power available in the water supply which is utilized to produce the air flow through the unit, and upon the uniformity of the distribution over the surface of the net, of both this air flow and the solution used by the unit.

When both the air flow and the solution are evenly distributed over the surface of the net, the foam produced at all points on the net will contain the same ratio of solution to air. The quantities of air and solution can then be selected so that all of the foam produced will have the proper ratio of solution to air for maximum effectiveness in fire fighting.

In the prior arrangement, maximum utilization of the available water power would be achieved only when all of the nozzles are directed tangentially (and therefore perpendicularly) to the shaft, and when all the nozzles are mounted at the greatest possible distance from the shaft to provide the largest moment arm.

On the other hand, the greatest uniformity in the distribution of the solution over the net area would be achieved when all of the nozzles are directed substantially parallel to the shaft and are mounted with at least some of the nozzles close to the shaft area.

However, these two optimum conditions cannot coexist in a workable unit of the prior art type. The reaction nozzles can both drive the fan and wet the net only if they are set at some intermediate angle with respect to the shaft, for example, at forty-five degrees thereto. Such a nozzle setting decreases the amount of power which these nozzles can extract from the water for the purpose of driving the fan. This nozzle setting also directs the spray of solution toward the outer edge of the net and therefore the axially positioned nozzle is required to wet the center of the net. The energy in the water issuing from this axial nozzle cannot be used to drive the fan, therefore, the efficiency of the unit is further reduced.

The radial distance at which the reaction nozzles are positioned from the axis of the shaft must also be a compromise. If the nozzles are positioned at a substantial radial distance from the shaft to increase the power extracted from the water, then the solution issuing therefrom is directed toward the outer edge of the net to an even greater extent. If the nozzles are positioned close to the axis of the shaft to increase the distribution of this solution over the net, then the amount of power extracted from the water is reduced.

In addition, the distribution of the solution over the net is seriously hampered in this prior art arrangement by the centrifugal force acting upon the solution issuing from the reaction nozzles because of the rotation of these nozzles. This centrifugal force tends to throw the solution outwardly thus further concentrating the solution at the outer edge of the net.

The type of fan which must be used in such a unit (i.e. a fan of the airplane propeller type which rotates on an axial shaft to produce an axial air flow) produces a non-uniform distribution of air over the surface of the net. Such a fan produces greater air flow near the tips of the blades than near the axis of rotation and hence produces a somewhat greater air flow at the edges of the net.

In practice, the prior art waterpowered units produce a foam, part of which is very wet and sinks to the bottom and part of which is light and floats on the top of the wet foam. It is believed that this non-uniform foam is produced because, at the edges of the net there is more solution than required for the available air flow, and at the central regions of the net there is less solution than required for the available air flow. Such non-uniform foam has reduced fire-fighting capabilities, particularly where the foam must flow over a distance to the location of the fire. The wet foam, because of its weight does not flow readily therefore only the light foam may reach the fire. This light foam may not contain enough water to effectively fight the fire and the excess water in the wet foam, which doesn't reach the fire, is wasted.

The prior art waterpowered foam generators therefore are inherently inefficient and a unit built along these lines cannot produce the volume of foam in a given time which the available water power and the total net area employed could theoretically produce if the total waterpower and the total net area were utilized.

Accordingly, it is an object of the present invention to produce a water powered foam generating apparatus which is not subject to these shortcomings.

Another object is to produce such apparatus which is highly efficient.

Another object is to produce such apparatus which efficiently utilizes both the available water power and the area of the net or other foam forming member.

Another object is to produce such apparatus wherein the maximum total energy is extracted from the water without reducing the effective foam forming area of the net or the like.

Another object is to produce such apparatus which generates a uniform foam.

Another object is to produce such apparatus wherein the air flow and the solution are uniformly distributed across the entire surface of the foam forming member.

A further object is to provide such apparatus which is simple and inexpensive to produce.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 1 is a longitudinal sectional view of a foam generator in accordance with the present invention.

FIG. 2 is a sectional view of the fan rotor and the net taken along the line 2—2 on FIG. 1.

FIG. 3 is a schematic view illustrating an arrangement for combining the foaming agent with the water supply.

Figure 6:
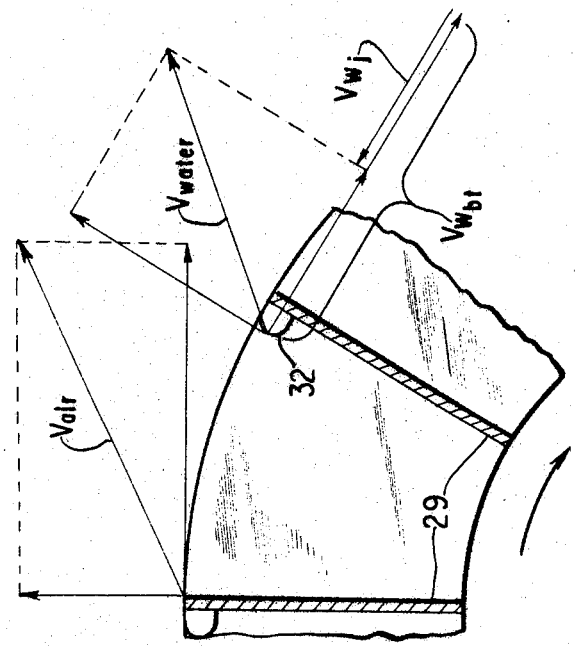
FIGS. 4 to 6 are vector diagrams illustrating the components and resultant velocities of the air and water particles issuing from the rotor of the fan under various conditions.

Referring now to FIGS. 1 to 3 of the drawing in detail, there is shown a water powered centrifugal fan 10 having a casing 11 and a rotor 12, a cylindrical net 14 mounted at the outer periphery of the casing 11 and positioned concentrically with the axis of rotation of the rotor, and a source 15 of forming solution under pressure for driving the rotor 12 and wetting the net 14.

The fan casing 11 includes a circular member 16 at one end, an annular member 17 at the other end having a central air intake opening 18, a plurality of U-shaped frame members 19 connecting the end members 16 and 17, a bearing 20 mounted at the center of the end member 16, a fluid coupling member 21 provided with a bearing 22 for transmitting fluid to a rotating tubular shaft 25 of the fan rotor, and a plurality of arms 24 secured between the end member 17 and the member 21 for supporting the member 21.

The fan rotor 12 includes the shaft 25 which is journaled in the bearings 20 and 22 and is provided with a bore 26 for receiving fluid from the coupling member 21, a circular blade supporting plate 27 secured to the shaft 25, a plurality of circumferentially spaced fan blades 19 mounted on the plate 27, an annular fluid manifold 20 secured to the outer corner of the blades 19 adjacent the casing end member 17, a plurality of fluid supply conduits 31 extending between the shaft 25 and the manifold 30, a fluid distributing tube 32 mounted adjacent the outer edge of each of the blades 29, and a plurality of nozzles 34 on each of the tubes 32 spaced along the length thereof. The tubes are annularly arranged substantially parallel to the axis of the rotor.

Each of the distributing tubes 32 is in fluid flow communication with the manifold 30 at one end and is sealed at the other end. The nozzles 34 are positioned to direct the fluid issuing therefrom substantially tangentially with respect to the fan rotor 12. Preferably, the nozzles 24 are spaced and formed so that the flow from adjacent nozzles is directed on the surface of the net to uniformly wet the entire width of the net as the tubes 32 revolve.

While the fan blades shown are of the flat or paddle wheel type, it is to be understood that any of the conventional types of centrifugal fan blade (including the forwardly curved, rearwardly curved, and air foil types) could be used.

A frusto-conical foam deflector 35 is attached to the end member 17 and extends forwardly towards the end member 16 to direct the foam produced in a direction parallel to the axis of the fan 10. The deflector 35 is provided with a cylindrical outer end section 36 to facilitate the attachment of a foam delivery hose thereto when it is desired to deliver foam from the unit to a remote location. In installations where the unit is located in an enclosure to extinguish fires occurring in that enclosure, the foam deflector 35 may be omitted.

The source 15 of foaming solution under pressure is connected to the fluid coupling member 21 by a fluid conduit 39 and comprises, as shown in FIG. 3, a source of water under pressure 40, a source of foaming agent 41, an inline proportioner 42, and a water flow rate control valve 43. The source 40 of water under pressure is connected through the valve 43 and the inline proportioner 42 to the conduit 39. The foaming agent from the source 41 is injected into the proportioner 42 through a fluid conduit 44 to become mixed with the flowing water to produce the foaming solution. Any suitable foaming agent may be used which will generate a large mass of bubbles on the net 14. For example, 30 percent active ammonium lauryl sulfate dissolved in water in a proportion of about 15 percent active material by weight can be used as the agent in source 41. This agent when mixed with water in a proportion of about 3 percent by volume has been found to produce high expansion foam having a ratio of air to water on the order of 1000 to 1 by volume.

In operation, the valve 43 is opened either manually or by a fire detecting system to allow water to flow through the inline proportioner 42. The flow of water through the proportioner 42 draws foaming agent from the source 41. The foaming agent is mixed with the water and the foaming solution produced flows through the conduit 39 to the fluid coupling 21, through the bore 26 and the supply conduits 31, and into the manifold 30. The solution flows from the manifold 30 into each of the distributing tube 32 and is sprayed from all of the nozzles 34 in a direction tangential to the rotor 12 as shown in FIG. 2.

The flow of solution issuing from the nozzles 34 produces a reaction thrust which drives the rotor 12 in the direction of the arrow shown in FIG. 2. The solution issuing from the nozzles 34 also impinges upon the inner surface of the net 14, and, as the rotor 12 rotates, uniformly wets the entire surface of the net.

The rotation of the rotor 12 of the centrifugal fan 10 draws air through the inlet opening 18 and propels this air radially outwardly in the manner common to centrifugal fans. Air is driven from the fan blades at all points about the circumference of the fan 10 and is uniformly distributed over the area of the net 14. The air flows through the net 14 and becomes entrained with the uniformly distributed solution to produce uniform foam over the entire surface of the net 14.

Since the air flow generated by a centrifugal fan has a large tangential velocity component in the direction of rotation of the rotor, it would appear that the air flow and the solution flow issuing from the rotor would be moving primarily in opposite directions. If this were true, the pumping action of the fan would be severely reduced by the presence of the solution spray. However, a closer analysis shows that the air flow and the solution flow actually are primarily in the same direction.

As the rotor 12 picks up speed after the valve 43 is opened, the direction of the spray issuing from the nozzles is influenced by the centrifugal force exerted upon the molecules of the solution by the rotation of the rotor. The resultant velocity of the spray depends upon the tangential velocity of the spray with respect to the blade tips, the tangential velocity of the blade tip itself and the radial velocity due to the centrifugal force acting upon the solution. In a like manner, the resultant velocity of the air molecules issuing from the blade tips is dependent upon the tangential velocity of the blade tips and the velocity due to the centrifugal force acting on the air.

The direction and speed of the combined flow of air and solution is dependent upon all of the above component velocities and varies according to the speed which the fan blade achieves as a result of a predetermined rate of flow from the nozzles 34.

Since the reaction nozzles 34 are mounted on the rotor, the thrust produced by the nozzles is at a constant value independent of the speed of the rotor. As the speed of the rotor increases, the amount of energy required to drive the fan also increases because of the increased work done by the fan. Therefore, a predetermined rate of flow from tht nozzles will accelerate the rotor to a speed at which the energy required to drive the rotor is equal to the energy supplied by the nozzles. Depending upon the construction of the unit, the maximum speed of the rotor may be less than, equal to, or greater than the velocity of the flow from the nozzles.

The interaction of the flow of air and solution is dependent upon the relative masses of air and solution involved. The percentage of foaming agent in the solution is small enough to permit neglecting it in the following computations. The high expansion foam produced by the present unit utilizes approximately equal weights of air and water. For example, in a foam having a volume ratio of air to water of 890 to 1, the ratio of the weight of air (.07 pound per cubic foot) to the weight of water (62.4 pounds per cubic foot) is 1 to 1.

The centrifugal force acting upon the air and water flow issuing from the fan rotor is determined by the formula $$F = \frac{W(V_1^2 - V_2^2)}{2g}$$

where
F is the centrifugal force,
W is the weight of the fluid,
$V_1$ is the speed of the fan at the point the fluid leaves the fan
$V_2$ is the speed of the fan at the point which the fluid enters the fan, and
g is the acceleration due to gravity.

If the radial dimension of the fan blade equals one half of the radius of the rotor then $V_2$ will equal one half of $V_1$ and the centrifugal force on the air is $$F \text{ (air)} = \frac{W[V_1^2 - (V_{1/2})^2]}{2g}$$

$$= \frac{3}{4} \frac{WV_1^2}{2g}$$

Since the water is introduced into the rotor at the axis, its $V_2$ is zero and the centrifugal force on the water is $$F \text{ (water)} = \frac{WV_1^2}{2g}$$

Since the total weight of water and air issuing from the fan are equal, then $$F(\text{air}) = \tfrac{3}{4} F \text{ (water)}$$

Thus, the centrifugal force acting on the water is 33% greater than the centrifugal force acting on the air, wherefore the radial velocity of the water may be assumed to be approximately 33% greater than that of the air.

Assuming that the resultant velocity of the air issuing from the blade tips is at an angle of about 25 degrees from the tangent to the rotor, the radial velocity component of the air can be calculated for any blade tip velocity. From the radial velocity of the air, the radial velocity of the solution can be calculated from the 33% factor mentioned above. The tangential velocity of the air and solution due to the blade tip velocity are assumed to equal the blade tip velocity. Vector diagrams can then be drawn for various rotor speeds and rates of solution flow to show the speed and direction of flow of the equal masses of air and water as they issue from the rotor.

Figure 5:
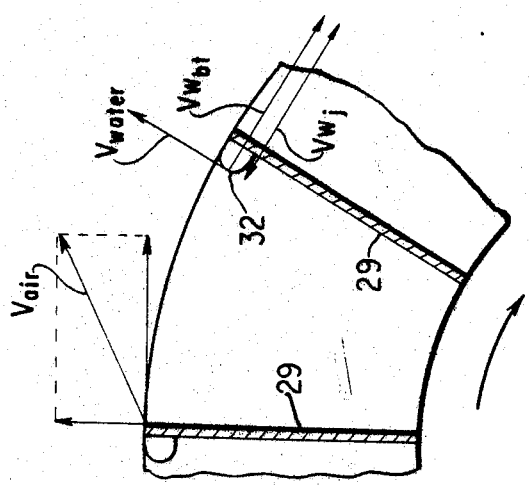
Figure 4:
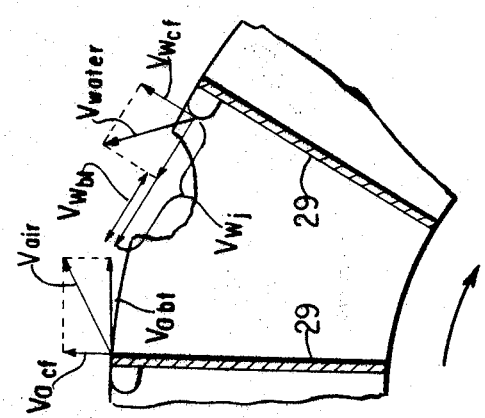

FIGS. 4 to 6 show the component and resultant velocities achieved by the air and water masses issuing from a fan rotor having paddle wheel blades for different blade tips speeds and a single rate of flow from the nozzles. In these figures $Va_{bt}$ = velocity of air due to blade tip velocity
$Va_{cf}$ = velocity of air due to centrifugal force
$V$ air = resultant velocity of air
$Vw_j$ = velocity of water with respect to the blade
$Vw_{bt}$ = velocity of water due to blade tip velocity
$Vw_{cf}$ = velocity of water due to centrifugal force
$V$ water = resultant velocity of water (solution)

In each of the FIGS. 4 to 6, the rate of flow of solution from the nozzle (the speed of the solution with respect to the blade) is 50 feet per second. In FIG. 4, the blade tip speed is 25 feet per second; in FIG. 5, the blade tip speed is 50 feet per second; and in FIG. 6, the blade tip speed is 100 feet per second.

It can be seen from FIG. 4, that when the blade tip velocity is substantially less than the velocity of the stream of solution, the air and solution flows interact to produce a substantially radial flow. It is undesirable to have the solution strike the net at right angles because a portion of the solution would then be sprayed directly through the holes in the net. However, the apparatus in accordance with the present invention would operate very efficiently if the net were pleated as shown in FIG. 4 of Patent No. 3,241,617.

It can be seen from FIG. 5, that when the blade tip velocity is substantially equal to the velocity of the stream of solution, the air and solution flow more nearly in the same direction. The combined flow would have a large radial component and a small tangential component and would therefore strike the net at an angle.

From FIG. 6 it can be seen that increasing the blade tip speed to a value of twice the velocity of the solution stream causes the air and the solution to flow to be substantially parallel so that the solution strikes the net at a greater angle to minimize solution loss.

As previously mentioned, the blade tip velocity which will result from a predetermined rate of flow of solution, is dependent upon the amount of work that the fan must do at various speeds. Since the amount of work the fan must do is dependent upon the permeability of the net, the direction of the combined flow of the air and solution can be altered by the selection of the net material. The amount of work that the fan must perform at a particular speed is also determined by the type of fan blade and its size. Thus, a highly efficient unit can be produced by the proper selection of net material, net configuration, and fan blade.

From the foregoing description, it will be seen that the present invention provides a simple and inexpensive water powered high expansion foam generator which efficiently utilizes the energy available in the supply of water and uniformly distributes the foaming solution and air flow over the entire net area to convert the maximum amount of the solution and the air into a uniform fire extinguishing foam.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Apparatus for producing fire-fighting foam comprising in combination a source of foam producing solution under pressure, water powered centrifugal fan means for directing air outwardly with respect to the axis of rotation thereof, a perforate foam forming wall member positioned radially outwardly of said fan means in the path of the air, and means for wetting said wall member with the solution, whereby said air passes through said wall member and becomes entrained with the solution to produce foam.

2. Apparatus for producing fire fighting foam comprising in combination centrifugal fan means mounted for rotation about a central axis for drawing air from adjacent the axis and propelling the air radially outwardly from the axis, a perforate foam forming wall member disposed outwardly of said fan means and positioned so that the air issuing from said fan means flows through said wall member, a source of foam producing solution under pressure, and means connected to said source for utilizing the pressure of said solution to drive said fan means and for wetting said wall member with the solution, whereby the air flowing through said wall member is entrained with the solution to produce foam.

3. Apparatus according to claim 2, wherein said foam forming wall member is concentric with the central axis and surrounds said fan means so that foam is generated at all points along the outer periphery of said wall member.

4. Apparatus according to claim 3, wherein said means for driving said fan means and for wetting said wall member includes nozzle means for directing a stream of the solution to both drive said fan means and wet said wall member.

5. Apparatus according to claim 4, wherein said nozzle means are mounted on said fan means and spray the solution in a manner to drive said fan means by reaction forces and to wet said wall member with the solution.

6. Apparatus according to claim 3, wherein said fan means includes a casing and a rotor, said casing having an air inlet adjacent said central axis and an air outlet extending around the outer periphery of said casing, said rotor including a plurality of air moving blades and means for journaling said rotor for rotation, and wherein said foam forming wall member is positioned across said air outlet and is co-extensive therewith.

7. Apparatus according to claim 6, wherein said means for driving said fan means and for wetting said wall member includes reaction nozzle means mounted on said rotor for spraying the solution in a manner to drive said rotor by producing reaction forces and to wet said wall member with the solution.

8. Apparatus according to claim 7, wherein said nozzle means include nozzles mounted adjacent the outer edge of said rotor, said nozzles being positioned to direct a stream of solution in a direction substantially tangential with respect to said rotor to produce maximum reaction force upon said rotor and to spray the solution directly upon said wall member.

9. Apparatus according to claim 8, wherein a plurality of said nozzle means are annularly arranged substantially parallel to the axis of said rotor and are spaced circumferentially from each other, and said nozzles being arranged in a row so as to wet the entire width of said wall member.

10. Apparatus according to claim 9, wherein each of said nozzles are mounted adjacent the outer edge of one of said blades.

11. Apparatus according to claim 2, wherein said last mentioned means includes nozzle means for directing a stream of the solution to simultaneously drive said fan means and wet said wall member.

12. Apparatus for producing fire-fighting foam comprising in combination a casing having an imperforate first end member and a second end member forming an air inlet, said casing being provided with a circumferentially extending side outlet between said end members, a source of foam producing solution under pressure, a perforate foam forming wall member positioned at said side outlet, a shaft within said casing, nozzle means connected to said source and mounted radially inwardly of said side outlet for simultaneously spraying the solution onto said wall member and driving said shaft, and fan means driven by said shaft for moving air from said inlet through said wall member to become entrained with the solution to form foam.

13. Apparatus according to claim 12 wherein said circumferentially extending side outlet defines a volume within said casing, and said nozzle means are within said voume and are carried by said shaft and positioned to spray the solution perpendicularly to said shaft to drive said shaft by reaction forces.

14. Apparatus for producing fire-fighting foam comprising in combination an annular air inlet member, a perforate foam forming wall member annular in cross section abutting said inlet member, said wall member defining a volume adjacent said inlet member, a source of foam producing solution under pressure, a shaft longitudinally positioned within said volume, nozzle means in fluid flow communication with said source and mounted on said shaft within said volume for spraying the solution directly onto said wall member in a manner to produce reaction forces to rotationally drive said shaft, and fan means driven by said shaft for moving air from said inlet member through said wall member to become entrained with the solution to form foam.

15. Apparatus for producing fire fighting foam comprising in combination a perforate foam forming wall member of annular cross section having a first and second end and defining a volume, an air inlet at said first end, a source of foam producing solution under pressure, nozzle means in fluid flow communication with said source and mounted within said volume for spraying the solution onto said wall member, and fan means driven by the spray from said nozzle means for moving air from said inlet through said perforate wall member to become entrained with the solution to form foam, said nozzle means being arranged to direct said spray at right angles to the axis of rotation of said fan.

16. Apparatus according to claim 15 wherein said foam forming wall is shaped to define a cylindrical volume and an imperforate member is provided at said second end of said wall.

17. Apparatus according to claim 16 wherein said nozzle means drive said fan by the reaction forces developed by the solution being sprayed onto said wall member.

References Cited

UNITED STATES PATENTS

| | | | |
|---|---|---|---|
| 1,882,911 | 10/1932 | Richards | 169—15 |
| 2,183,561 | 12/1939 | Hamblin | 169—15 |
| 2,218,294 | 10/1940 | Muller | 169—15 |
| 2,979,269 | 4/1961 | Bols | 239—504 |
| 2,988,343 | 6/1961 | Edwards et al. | 169—15 |
| 3,142,340 | 7/1964 | Jamison | 169—15 |
| 3,241,617 | 3/1966 | Jamison | 169—15 |
| 3,342,271 | 9/1967 | Anthony | 169—15 |

EVERETT W. KIRBY, *Primary Examiner.*